(12) United States Patent
Fordos et al.

(10) Patent No.: US 11,700,176 B1
(45) Date of Patent: Jul. 11, 2023

(54) NETWORK DEVICE CONFIGURATION

(71) Applicant: Cisco Technology, Inc., San Jose, CA (US)

(72) Inventors: Viktoria Fordos, Bandhagen (SE); Santosh Ramrao Patil, Milpitas, CA (US); Viktor Mats Emanuel Leijon, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/579,427

(22) Filed: Jan. 19, 2022

(51) Int. Cl.
*H04L 41/0816* (2022.01)
*H04L 43/12* (2022.01)
*H04L 43/08* (2022.01)

(52) U.S. Cl.
CPC .......... *H04L 41/0816* (2013.01); *H04L 43/08* (2013.01); *H04L 43/12* (2013.01)

(58) Field of Classification Search
CPC ...... H04L 41/0816; H04L 43/08; H04L 43/12
See application file for complete search history.

(56) References Cited

U.S. PATENT DOCUMENTS

| | | | |
|---|---|---|---|
| 8,316,438 B1* | 11/2012 | Bush | H04L 12/66 726/22 |
| 2013/0111008 A1* | 5/2013 | Black | H04L 43/04 709/224 |
| 2015/0195668 A1* | 7/2015 | Kuo | H04W 12/35 709/220 |
| 2018/0359146 A1 | 12/2018 | Bevemyr et al. | |
| 2020/0076875 A1 | 3/2020 | Sabella et al. | |
| 2020/0110627 A1 | 4/2020 | Chou et al. | |
| 2020/0177629 A1 | 6/2020 | Hooda et al. | |
| 2021/0037427 A1 | 2/2021 | Hughes et al. | |
| 2021/0084509 A1* | 3/2021 | Li | H04W 52/241 |
| 2021/0152458 A1* | 5/2021 | Cioffi | H04L 41/0677 |
| 2022/0046661 A1* | 2/2022 | Jeon | H04W 72/1263 |

\* cited by examiner

*Primary Examiner* — John A Follansbee
*Assistant Examiner* — Fadi Haj Said
(74) *Attorney, Agent, or Firm* — Lee & Hayes, P.C.

(57) ABSTRACT

A method of configuring network devices. The method may include, with a network orchestrator, measuring at least one characteristic of a quality of a link between a network device and the network orchestrator during a first measurement window, categorizing the link into a connection type based on the at least one characteristic, and tuning a configuration of the network device based at least in part on the connection type identified by the network orchestrator.

18 Claims, 7 Drawing Sheets

NETWORK DEVICE CONFIGURATION

TECHNICAL FIELD

The present disclosure relates generally to computer networking. Specifically, the present disclosure relates to systems and methods for determining a number of device to network orchestrator connection characteristics to improve throughput characteristics of the network orchestrator.

BACKGROUND

Network configuration management has been utilized to maintain and arrange the configuration of a computing network. Network configuration may include, for example, the initial process of defining the operations, flows, and controls of the network and maintaining and arranging the information associated with all the components of the network. Network configuration management, then, may include an ongoing process of overseeing the setup and maintenance of all network computing devices, as well as any software and firmware installed on the computing devices. Network configuration management may further include the discovery of devices, the monitoring of device configuration and status, and the maintenance of inventory. In some situations, orchestration-based network configuration management may suffer from device reachability where bad network conditions make things complicated.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
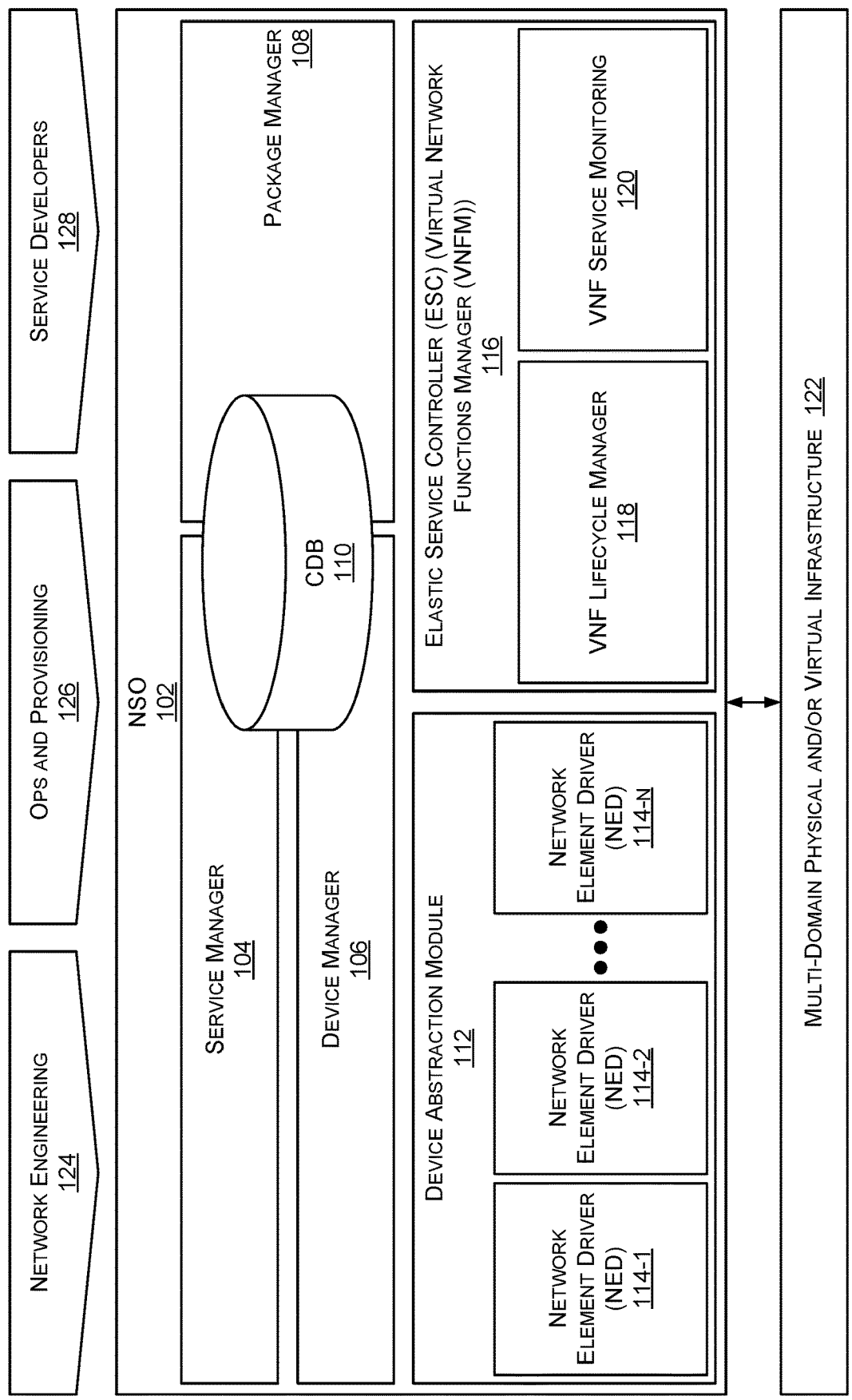
FIG. 1 illustrates a system-architecture diagram of a network orchestrator, according to an example of the principles described herein.

As mentioned above, network configuration management may be utilized to maintain and arrange the configuration of a computing network. Some entities provide network configuration management as a service such as orchestration-as-a-service (OaaS) and/or networking-as-a-service (NaaS) where software defined networking (SDN), programmable networking, and application program interface (API)-based operations are utilized in association with wide area network (WAN) services, transport, cloud, hybrid cloud, multi-cloud, private network interconnect, and Internet exchanges, among others. In this example, an entity such as a corporation may purchase routers, switches, and other networking devices, and a web interface may be provided to an administrator of the entity that assists the administrator in managing the network. Further, some large service providers themselves may also have similar needs internally for on-premises automation.

In a situation where an OaaS provider is providing services to thousands of entities where each entity utilizes, for example, on average ten networking devices, a number of challenges may arise. For example, a smaller entity may include a chain of five stores and may have, for example, ten networked devices. Interruption of even one network device may cause significant disruption for the remaining networked devices located at other stores within the chain of stores.

In order to best assist these smaller entities, it may be helpful to determine or measure a quality of a link between that network device and a network orchestrator to determine generally of the network devices are regularly down, regularly functioning nominally, reachability of the devices, etc. When configuration changes to the network devices are scheduled, or grouping of the network devices is performed, knowing that a particular network device is regularly down may not be a cause of concern since the small entity is used to that particular device regularly being down. In other words, it may be beneficial to know if the down status of a network device is expected or anomalous in order to prioritize for network configuration processes.

Further, large-scale orchestration-based configuration management through a network orchestrator such as the Network Services Orchestrator (NSO) developed and distributed by Cisco Systems, Inc. may also face issues related to network device reachability and link quality. This may be the case especially for user datagram protocol (UDP)-based protocols. For example, a UDP-based protocol may include a simple network management protocol (SNMP) where unreliable, unpredictable, and/or degraded network conditions may create complications among the network devices. In this example, a network orchestrator may use response timers and retry mechanisms to ensure communication towards the managed network devices. In this manner, the network orchestrator may treat each network device equally or in the same manner since each device within the network is identified as equally important. The response timers and retry counts used by the network orchestrator may be static and may include, for example, a 30-second time-out as a response timer, and 6 retries as the retry count. However, this static approach to handling unreliable, unpredictable, and/or degraded network conditions may lead to a static delay in detecting a failure of communication between one or more network devices and the network orchestrator.

In turn, these types of delays in detecting failure may lead to significant issues when the network orchestrator is required or scheduled to update a large set of network devices in bulk. In this scenario of bulk updating of network devices, a very large amount of configuration transactions may be performed sequentially, one network device at a time. Some examples of bulk processing may include, for example, processing a regional outage, a server or a component crash, bulk configuration update for a network site, among other network wide configuration processes. Thus, if network connection towards several of the network devices in such a bulk update fails, this may lead to the significant time delay in getting an entire operation to be completed.

For example, in some data center outages, customer deployments may take multiple hours to get network device configuration recovered and updated by the network orchestrator or controller. The present systems and methods seek to improve areas in these types of bulk serial operations by detecting failure of communication to and among network devices so the orchestration may quickly move on to other network devices in instances where, for example, a particular network device is known or expected to be down or otherwise. Even minor improvements in orchestration-based network configuration management may save hours of bulks configuration update events.

In addition to the above, in a large computer networking environment, network devices may belong to different conceptual classes. For example, the network may include a number of core routers that are closely monitored, well maintained, and may be expected to have high availability. If, for example, these core routers were to experience an outage or low performance, the entire network may be significantly impacted. In contrast, customer premise equipment (e.g., routers, switches, etc.) and edge equipment (e.g., access points, etc.) may wildly varying properties. In contrast, some customer premise network devices may be connected over unreliable communication links to a network orchestrator, may be located at remote sites with bad link properties, may be located at sites with unreliable power, or may even be powered off for long periods of time for various reasons. Further, outages or low performance experienced at the customer premise network devices may be less impactful on the remainder of the network devices within the network. The core routers may, therefore, be treated differently with respect to the customer premise network devices. Network orchestrators may not be able to differentiate between the different types of devices such as the core routers and the customer premise network devices and may rely on the statically configured parameters in providing network configuration management services. However, a deeper insight into the class a network device belongs to may make it possible to better understand what behavior is expected or anomalous and may result in more devices being managed in a more efficient and appropriately prioritized manner.

OVERVIEW

In the examples described herein, a number of network device to network orchestrator connection characteristics such as, for example, connection latency, jitter, and bandwidth characteristics may be determined and stored. Determining the network orchestrator connection characteristics improves throughput characteristics of the network orchestrator by using the network orchestrator connection characteristics to dynamically tune the response timers and retries for individual network devices. This accordingly allows for the detection of a communication failure more efficiently and faster. Further, the systems and methods described herein build and provide valuable insights of the network device characteristics to users.

Examples described herein provide a method of configuring network devices. The method may include, with a network orchestrator, measuring at least one characteristic of a quality of a link between a network device and the network orchestrator during a first measurement window, categorizing the link into a connection type based on the at least one characteristic, and tuning a configuration of the network device based at least in part on the connection type identified by the network orchestrator.

The measuring of the at least one characteristic of the quality of the link between the network device and the network orchestrator may include, with the network orchestrator, transmitting a probe callback. The probe callback establishes a connection with the network device, measures the at least one characteristic, and transmits the characteristics as measured to the network orchestrator. The method may further include persisting in a data storage device the characteristics as measured via the probe callback.

The method may further include looking up the at least one characteristic as measured via the probe callback in the data storage device and configuring the network device based on the at least one characteristic. The at least one characteristic comprises at least one of latency, upload speed, download speed, jitter, packet loss, or combinations thereof.

The method may further include remeasuring the at least one characteristic at least once during a second measurement window based at least in part on detection of a change in the at least one characteristic has occurred, and recategorizing the link based at least in part on a determination that the at least one characteristic has changed. Tuning the configuration of the network device based at least in part on the connection type identified by the network orchestrator may include, based on the connection type, tuning the configuration in terms of at least one of a timer value, a retry count, a keep-alive timeout, or combinations thereof.

The method may further include measuring at least one reliability metric of the network device, the reliability metric defining at least one of a reachability of the network device, an operating state of a management interface of the network device, or combinations thereof. The method may further include categorizing the network device into a number of classes based on the reliability metric of the network device. The number of classes may include a first class defining that the network device is always available, a second class defining that the network device is intermittently available, and a third class defining that the network device is always unavailable. The method may further include configuring changes to the network device based on a prioritization of the first class over the second class and the second class over the third class.

Examples described herein also provide a non-transitory computer-readable medium storing instructions that, when executed, causes a processor to perform operations. The operations may include, with a network orchestrator, measuring at least one characteristic of a quality of a link between a network device and the network orchestrator during a first measurement window, categorizing the link into a connection type based on the at least one characteristic, and tuning a configuration of the network device based at least in part on the connection type identified by the network orchestrator.

Measuring of the quality of the link between the network device and the network orchestrator may include, with the network orchestrator, transmitting a probe callback. The probe callback may establish a connection with the network device, measure the at least one characteristic, and transmit the characteristics as measured to the network orchestrator. The operations may further include persisting in a data storage device the characteristics as measured via the probe callback.

The operations may further include looking up the at least one characteristic as measured via the probe callback in the data storage device and configuring the network device based on the at least one characteristic. The at least one characteristic comprises at least one of latency, upload speed, download speed, jitter, packet loss, or combinations thereof.

The operations may further include remeasuring the at least one characteristic at least once during a second measurement window based at least in part on detection of a change in the at least one characteristic has occurred, and recategorizing the link based at least in part on a determination that the at least one characteristic has changed. Tuning the configuration of the network device based at least in part on the connection type identified by the network orchestrator comprises, based on the connection type, tuning the configuration in terms of at least one of a timer value, a retry count, a keep-alive timeout, or combinations thereof.

The operations may further include measuring at least one reliability metric of the network device. The reliability metric may define at least one of a reachability of the network device, an operating state of a management interface of the network device, or combinations thereof. The operations may further include categorizing the network device into a number of classes based on the reliability metric of the network device. The number of classes may include a first class defining that the network device is always available, a second class defining that the network device is intermittently available, and a third class defining that the network device is always unavailable. The operations may further include configuring changes to the network device based on a prioritization of the first class over the second class and the second class over the third class.

Examples described herein also provide a network orchestrator including a processor, and a non-transitory computer-readable media storing instructions that, when executed by the processor, causes the processor to perform operations. The operations may include measuring at least one characteristic of a quality of a link between a network device and the network orchestrator during a first measurement window, categorizing the link into a connection type based on the at least one characteristic, and tuning a configuration of the network device based at least in part on the connection type identified by the network orchestrator. The operations may further include measuring at least one reliability metric of the network device. The reliability metric may define at least one of a reachability of the network device, an operating state of a management interface of the network device, or combinations thereof. The operations may further include categorizing the network device into a number of classes based on the reliability metric of the network device. The classes may include a first class defining that the network device is always available, a second class defining that the network device is intermittently available, and a third class defining that the network device is always unavailable. The operations may further include configuring changes to the network device based on a prioritization of the first class over the second class and the second class over the third class.

Measuring of the quality of the link between the network device and the network orchestrator may include, with the network orchestrator, transmitting a probe callback. The probe callback may establish a connection with the network device, measuring the at least one characteristic, and transmitting the characteristics as measured to the network orchestrator. The operations may further include persisting in a data storage device the characteristics as measured via the probe callback, looking up the at least one characteristic as measured via the probe callback in the data storage device, and configuring the network device based on the at least one characteristic.

The operations may further include remeasuring the at least one characteristic at least once during a second measurement window based at least in part on detection of a change in the at least one characteristic has occurred, and recategorizing the link based at least in part on a determination that the at least one characteristic has changed. Tuning the configuration of the network device based at least in part on the connection type identified by the network orchestrator may include, based on the connection type, tuning the configuration in terms of at least one of a timer value, a retry count, a keep-alive timeout, or combinations thereof.

Additionally, the techniques described in this disclosure may be performed as a method and/or by a system having non-transitory computer-readable media storing computer-executable instructions that, when executed by one or more processors, performs the techniques described above.

EXAMPLE EMBODIMENTS

Turning now to the figures, FIG. 1 illustrates a system-architecture diagram 100 of a network services orchestrator (NSO) 102, according to an example of the principles described herein. The NSO 102 may include any hardware, software, or combinations thereof that configures a number of network elements including physical and virtual infrastructure based on a concept of abstraction in order to simplify the configuring task for an individual such as an administrator. The hardware, software, or combinations thereof of the NSO 102 may provide a bridge between automation and orchestration frameworks such as for example, business process workflows, an operations support system/business support system (OSS/BSS), and software development and IT operations (DevOps) tooling and the underlying physical and virtual infrastructure. Information regarding the network to be orchestrated by the NSO 102 may be utilized by the various elements of the NSO 102 described herein. In one example, information from sources such as network engineering 124, ops and provisioning 126, service developers 128, OSS/BSS, and element management system/network management system (EMS/NMS), among other sources may be provided to the NSO 102 to allow the NSO 102 to generate a single API to all network devices using the network engineering 124, leverage that API for all services provided via the NSO 102 using the information provided by the ops and provisioning 126, and provide for an administrator to develop a number of services using the information provided by the service developers 128. The network devices described herein may include, for example, any computing device included within the multi-domain physical and/or virtual infrastructure 122. For example, a number of client devices, routers, switches, access points, firewalls, WIFI communications devices, virtual machines (VMs), and myriad of other physical and virtual computing devices may be included within the multi-domain physical and/or virtual infrastructure 122.

The NSO 102 may institute a set of northbound software interfaces and APIs that allow the NSO 102 to integrate with any number of northbound tools and systems. A northbound interface of a component may include any interface that allows a component to communicate with a higher level component and utilizes a southbound interface of another component. The NSO 102 may work across different vendors and/or multiple domains due to an extensible southbound architecture. A number of network orchestrators (e.g., NSOs 102) may be utilized within a network such as, for example, a cloud network. The NSO 102 may include a core engine that performs core functionality of the NSO 102, acts as the central engine that connects all the components of the NSO 102 together, reads an initial configuration from a configuration file (e.g., ncs.conf). A number of configuration and operational data may be handled in the configuration database (CDB) 110 described below.

The NSO 102 may include a service manager 104, a device manager 106, a package manager 108, a CDB 110, a device abstraction module 112, and an elastic service controller (ESC) (e.g., a virtual network functions manager (VNFM)) 116, among other elements. The service manager 104 may provide a number of services including, for example, modeling using yet another next generation (YANG), device mapping via, for example, template + Python/Java code, activating, modifying, decommissioning, and/or restoring of devices within the network, synchronizing with device configurations, aggregating operational data, and other functions.

The device manager 106 may handle device configurations including a device configuration framework that may be defined using YANG data models received from network element drivers (NEDs) such as NEDs 114-1, 114-2, . . . , 114-N where N is any integer greater than or equal to 1 (collectively referred to herein as NED 114 unless specifically addressed otherwise). In one example, a FASTMAP algorithm may be utilized to control and optimize southbound configuration actions implemented by the device manager 106 to create, modify, and/or delete devices within the network.

The package manager 108 may load and manage packages sent between the various elements within a network. In one example, all additions to the core NSO 102 functionality may be deployed as packages. By deploying the additions to the NSO 102 may simplify deployment and enable hot-deployment, redeployment, and upgrading of devices within the network.

The CDB 110 may include any data storage device capable of functioning as a database to organize a collection of data stored therein and accessible by the NSO 102. The NSO 102 may store or cause to be stored configuration data for computing devices and systems in the CDB 110 including, for example, services models a device models. In one example, the CDB 110 may include a tree-structure database that is controlled by a YANG schema so that the data stored within the NSO 102 may be validated against the schema. In one example, the CDB 110 may be atomicity, consistency, isolation, durability (ACID) compliant, and may be fast, lightweight, and fault tolerant. In one example the data stored within the CDB 110 may be stored as compact binary extensible markup language (XML) analogue format. Further, in one example, the CDB 110 may be an in-memory database with file system journaling for persistence. In one example, the CDB 110 may include 1:N data replication support, in-service data model updating, automatic schema and data updating, automatic loading of initialization data, other features, and combinations thereof. In one example, an entirety or portions of the data stored in the CDB 110 may be displayed via a command line interface (CLI) or other type of interface including operational data in an operational mode and network configuration data in a configuration mode.

The device abstraction module 112 of the NSO 102 may assist in simplifying the configuring task for an administrator via the NEDs 114. The device abstraction module 112 and the NEDs 114 abstract underlying protocol and data models and may also perform error handling. Thus, the device abstraction module 112, via the NEDs 114, perform multivendor abstraction. Further, the NEDs 114 of the device abstraction module 112 compute an ordered sequence of device specific commands to go from a current configuration state of the network to a desired configured state.

The NSO 102 may use the NEDs 114 in order to support a wide range of multivendor devices. Device adaptors may present issues in networking since the device adapters cannot be upgraded at the same pace as device interfaces and adding support for new devices may take months. The NEDs 114, in contrast, may be either generated automatically from the device YANG model, or may add new commands and devices in a matter of weeks. Using NEDs 114, the NSO 102 makes device configuration commands available over a network wide, multivendor CLI, APIs, and user interface. Further, the NSO 102 services, such as, for example a virtual private network (VPN), may configure a complex multivendor network. The NEDs 114 comprise the network-facing part of the NSO 102 and communicate over the native protocol supported by the device, such as network configuration protocol (NETCONF), representational state transfer (REST), XML, CLI, and SNMP.

The NEDs 114 may be rendered based on a YANG data model. This may provide a number of advantages including, for example, drastically shortened development and update cycles. Rather than hand crafting adaptors the NEDs 114 of the NSO 102 may be rendered from a YANG data model that can automatically generate the corresponding commands, such as CLI commands. Another advantage of rendering the NEDs 114 based on the YANG data model may include no requirement for development in instances where a computing device offers a NETCONF/YANG interface since the NEDs 114 may be generated automatically from the device model. Further, another advantage may include having a uniform data model across the network where, for example, across the NSO 102 interfaces and any APIs, it appears as though the computing devices support YANG even if the underlying mechanisms may be CLI or REST. Still further, the NEDs 114 of the NSO 102 may provide transactionality for nontransactional devices. A transactional engine of the NSO 102 may drive the NEDs 114 to perform atomic changes and rollback on failure, even when a device has no native support for transactions. Transactional behavior significantly reduces the volume of code, cost of development and maintenance, and time to market for service applications.

The NSO 102 may also include or associated with the ESC 116. In one example, the ESC 116 may be embodied within a computing device separate from the NSO 102. The ESC 116 may include, for example, a virtual network functions manager (VNFM). The ESC 116 may include any module that performs lifecycle management of virtual network functions (VNFs) via, for example, a VNF lifecycle manager 118. Further, the ESC 116 may include a VNF service monitoring module 120 to provide agentless and multi-vendor VNF management by provisioning the virtual services and monitoring their health and promoting agility, flexibility, and programmability in network function virtualization (NFV) environments. Further, the VNF service monitoring module 120 of the ESC 116 may define rules for monitoring, and associate actions that are triggered based on the outcome of the rules. Based on the monitoring results, the VNF service monitoring module 120 of the ESC 116 may performs scale in or scale out operations on the VNFs, automatically recover from a virtual machine (VM) failure instance, among other functions.

The ESC 116 may perform life cycle management of the VNFs including, for example, VNF onboarding, configuring the VNFs, monitoring the VNFs, and making VNF-level life cycle decisions such as healing and scaling based on a number of key performance indicator (KPI) requirements. In one example, the ESC 116 and any VNFs managed thereby may be deployed as VMs running within a virtual infrastructure manager (VIM). A core engine of the ESC 116 may manage transactions, validations, policies, workflows, VM state machines and rollbacks, among other functions.

Figure 2:
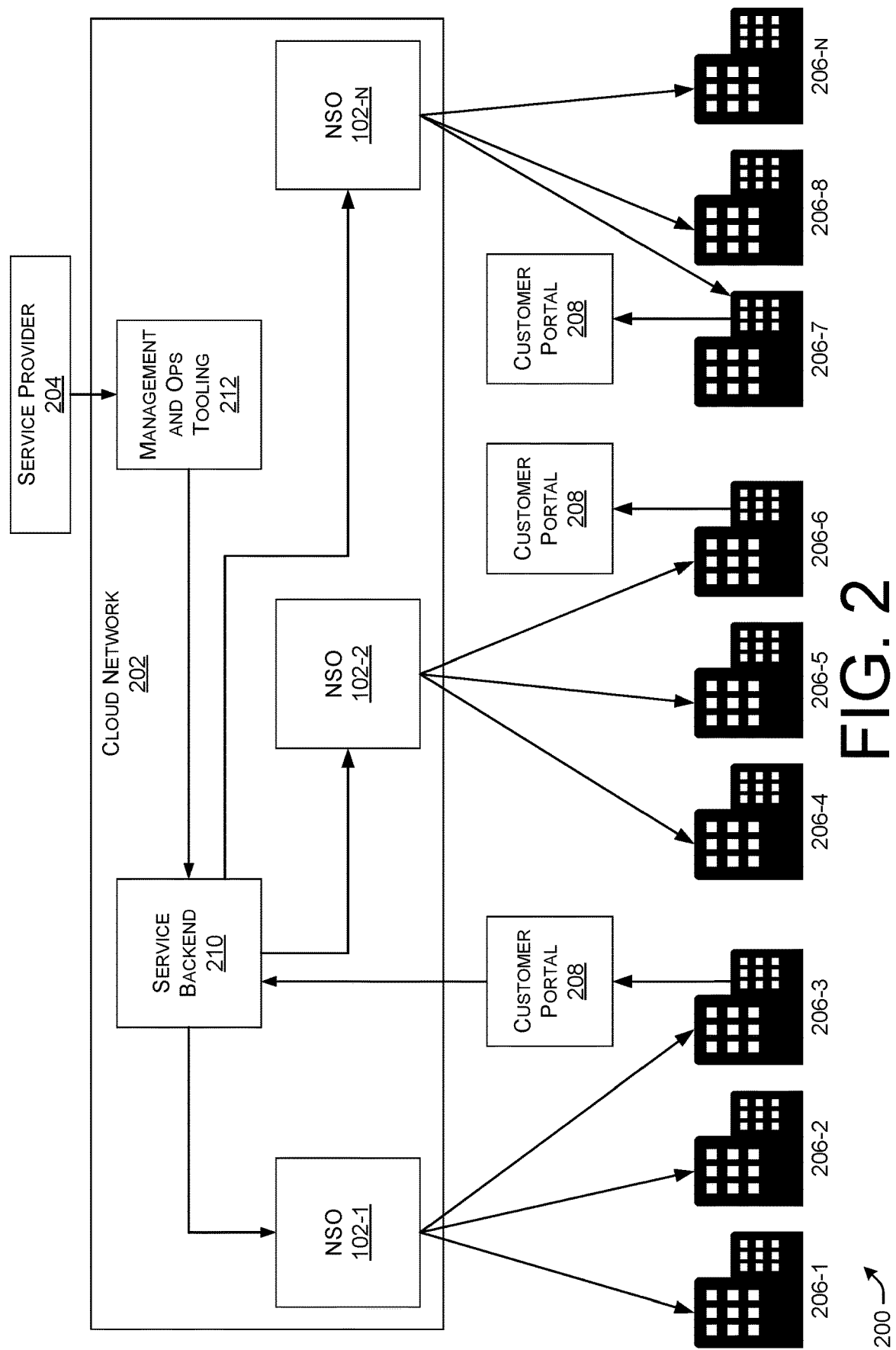
FIG. 2 illustrates a system-architecture diagram of a network in which a network services orchestrator (NSO) of FIG. 1 may operate, according to an example of the principles described herein.

FIG. 2 illustrates a system-architecture diagram 200 of a cloud network 202 in which the NSO 102 of FIG. 1 may operate, according to an example of the principles described herein. The cloud network 202 may be controlled by and/or receive input from a service provider 204 that may provide the cloud network 202 and/or control the functions of a number of NSOs 102-1, 102-2, . . . , 102-N where N is any integer greater than or equal to 1 (collectively referred to herein as NSO 102 unless specifically addressed otherwise). The cloud network 202 may be communicatively coupled to a number of enterprise networks 206-1, 206-2, 206-3, 206-4, 206-5, 206-6, 206-7, 206-8, 206-N where N is any integer greater than or equal to 1 (collectively referred to herein as enterprise networks 206 unless specifically addressed otherwise). The enterprise networks 206 may have include a number of computing devices such as a number of routers, switches, access points, firewalls, WIFI communications devices, and myriad of other physical and virtual computing device as similarly described above in connection with the multi-domain physical and/or virtual infrastructure 122 of FIG. 1. A number of client devices and/or virtual machines (VMs) may be communicatively coupled to these network devices so that an end user may be able to access services provided by the cloud network 202 and the NSO 102.

A customer portal 208 may be provide to some or all of the enterprise networks 206 in order to allow users to interact with a service backend 210. The service backend 210 may provide a number of computing resources at the data access layer of the cloud network 202 so that the NSOs 102 may function as described herein. The services the service backend 210 may provide may include, for example, hardware or infrastructure (e.g., data processing devices, motherboards, graphics processing units (GPUs), network cards, accelerator cards, etc.), data storage services, data processing services, data management services, security services, and cloud runtime services, among other services.

The computing devices of the enterprise networks 206 may communicate with the service backend 210 via the customer portals 208 and may receive queries of varying types from the customer portals 208 and may respond to those queries. These queries may include, for example, a request regarding the configuration of at least one network devices within the multi-domain physical and/or virtual infrastructure 122 and/or the enterprise networks 206 such as routers, switches, access points, firewalls, WIFI communications devices, virtual machines (VMs), and myriad of other physical and virtual computing devices.

The cloud network 202 may further include a management and operations tooling module 212 with which the service provider 204 is communicatively coupled. The management and operations tooling module 212 may assist in developing the management and operations tools the NSOs 102 are to utilize and to run the services provided by the service provider 204 and executed by the NSOs 102.

The various elements of FIGS. 1 and 2 may be provided by the service provider 204 to a customer as Infrastructure-as-a-Service (IaaS), Platform-as-a-Service (PaaS), Software-as-a-Service (SaaS), other forms of online services (e.g., other as-a-Service types) and any cloud-based delivery that offers to an end user software, infrastructure, and platforms. Having described the system-architecture diagram 100 of the NSO 102 and the system-architecture diagram 200 of the cloud network 202 in which the NSO 102 of FIG. 1 may operate, we now turn to the hardware and software components of the NSO 102 in relation to FIG. 3.

Figure 3:
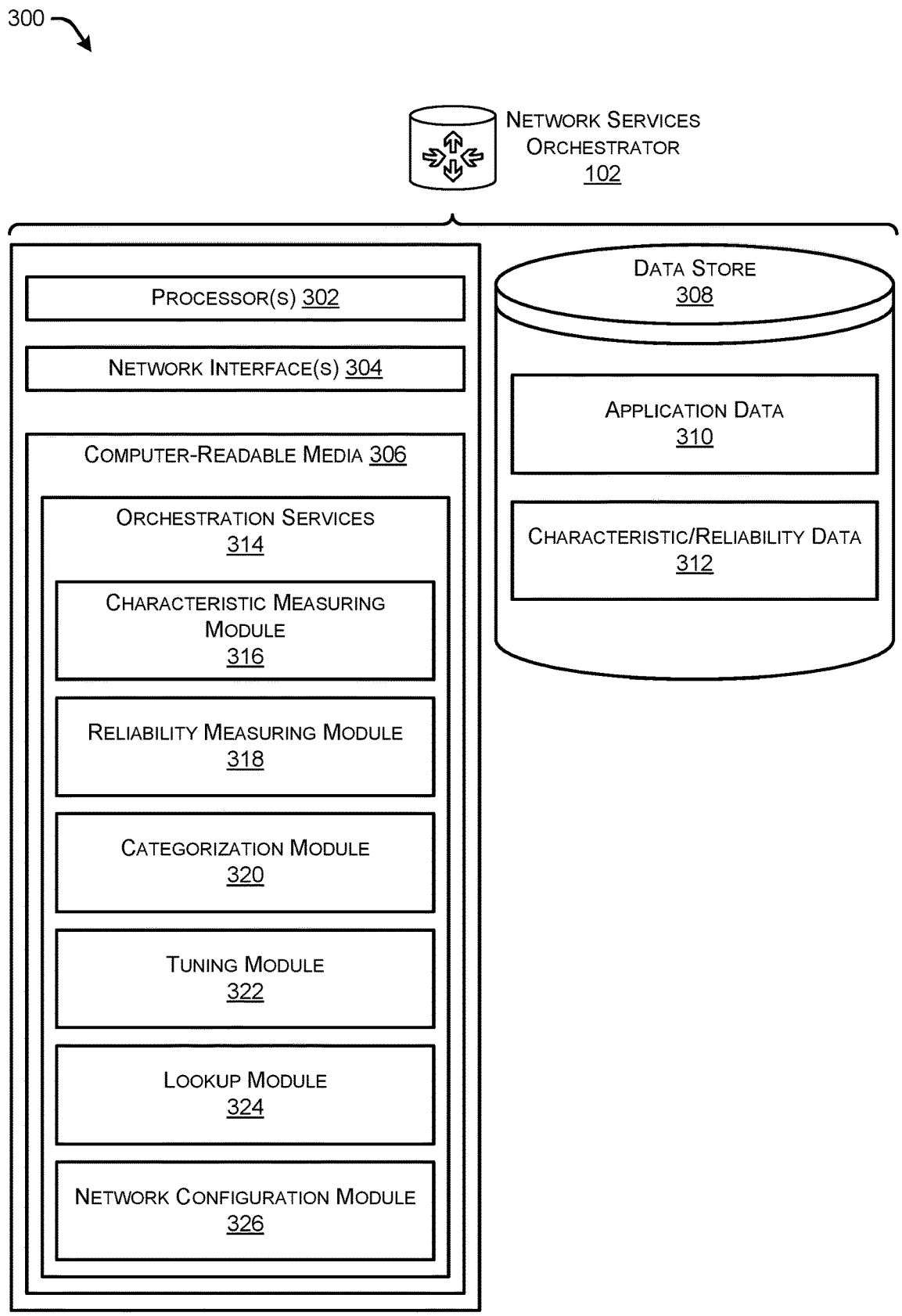
FIG. 3 is a component diagram of example components of the NSO of FIG. 1, according to an example of the principles described herein.

FIG. 3 is a component diagram 300 of example components of the NSO 102 of FIG. 1, according to an example of the principles described herein. As illustrated, the NSO 102 may include one or more hardware processor(s) 302 configured to execute one or more stored instructions. The processor(s) 302 may comprise one or more cores. Further, the NSO 102 may include one or more network interfaces 304 configured to provide communications between the NSO 102 and other devices, such as devices associated with the system-architecture diagram 100 of the NSO 102 and the system-architecture diagram 200 of the cloud network 202 in which the NSO 102 of FIG. 1 may operate including the service manager 104, the device manager 106, the package manager 108, the CDB 110, the device abstraction module 112, the ESC 116, the multi-domain physical and/or virtual infrastructure 122, the cloud network 202, the computing devices associated with the enterprise networks 206, the service backend 210 the management and operations tooling module 212, and/or other systems or devices associated with the NSO 102 and/or remote from the NSO 102. The network interfaces 304 may include devices configured to couple to personal area networks (PANs), wired and wireless local area networks (LANs), wired and wireless wide area networks (WANs), and so forth. For example, the network interfaces 304 may include devices compatible with the system-architecture diagram 100 of the NSO 102 and the system-architecture diagram 200 of the cloud network 202 in which the NSO 102 of FIG. 1 may operate including the service manager 104, the device manager 106, the package manager 108, the CDB 110, the device abstraction module 112, the ESC 116, the multi-domain physical and/or virtual infrastructure 122, the cloud network 202, the computing devices associated with the enterprise networks 206, the service backend 210 the management and operations tooling module 212 and/or other systems or devices associated with the NSO 102.

The NSO 102 may also include computer-readable media 306 that stores various executable components (e.g., software-based components, firmware-based components, etc.). In one example, the computer-readable media 306 may include, for example, working memory, random access memory (RAM), read only memory (ROM), and other forms of persistent, non-persistent, volatile, non-volatile, and other types of data storage. In addition to various components discussed herein, the computer-readable media 306 may further store components to implement functionality described herein. While not illustrated, the computer-readable media 306 may store one or more operating systems utilized to control the operation of the one or more devices that comprise the NSO 102. According to one example, the operating system comprises the LINUX operating system. According to another example, the operating system(s) comprise the WINDOWS SERVER operating system from MICROSOFT Corporation of Redmond, Washington. According to further examples, the operating system(s) may comprise the UNIX operating system or one of its variants. It may be appreciated that other operating systems may also be utilized.

Additionally, the NSO 102 may include a data store 308 which may comprise one, or multiple, repositories or other storage locations for persistently storing and managing collections of data such as databases, simple files, binary, and/or any other data. The data store 308 may include one or more storage locations that may be managed by one or more database management systems. In one example, the data store 308 may include or may form at least part of the CDB 110 described herein.

The data store 308 may store, for example, application data 310 defining computer-executable code utilized by the processor 302 to execute the computer-readable media 306. Further, the application data 310 may include data relating to and/or associated with the service manager 104, the device manager 106, the package manager 108, the CDB 110, the device abstraction module 112, the ESC 116, the multi-domain physical and/or virtual infrastructure 122, the cloud network 202, the computing devices associated with the enterprise networks 206, the service backend 210 the management and operations tooling module 212 and/or other systems or devices associated with the NSO 102, and other data that may be used by the NSO 102 to configure network devices, and, more specifically, determine network device to NSO 102 connection characteristics such as connection latency, jitter, and bandwidth, determine reliability metrics of the connection between the network device and the NSO 102, categorize the network devices based at least in part on the characteristics and/or the reliability metrics, dynamically tuning response timers and retries based at least in part on the characteristics and/or the reliability metrics to detect the communication failure more efficiently and faster, store the characteristics and/or the reliability metrics in a data storage device such as data store 308, provide lookup capabilities to the NSO 102 to lookup the based at least in part on the characteristics and/or the reliability metrics within the data store 308, and configure the network including a number of network devices based at least in part on the characteristics and/or the reliability metrics.

Further, the data store 308 may store characteristic and/or reliability data 312. The characteristic and/or reliability data 312 may include any data obtained by the NSO 102 regarding the characteristics such as connection latency, jitter, and bandwidth, and/or reliability metrics of the connection between the network device and the NSO 102. This characteristic and/or reliability data 312 may assist the NSO 102 in the network device configuration processes described herein.

The computer-readable media 306 may store portions, or components, of orchestration services 314 provided by the NSO 102. For example, the orchestration services 314 of the computer-readable media 306 may include a characteristic measuring module 316 to, when executed by the processor(s) 302, determine network device to NSO 102 connection characteristics such as connection latency, jitter, and bandwidth, among other connection characteristics. The NSO 102 may use these characteristics to categorize the connection or link into a connection type based on at least one characteristic determined by the characteristic measuring module 316. The characteristic measuring module 316 may also, when executed by the processor(s) 302, cause the connection characteristics to be stored within the data store 308 as the characteristic data of the characteristic/reliability data 312.

The computer-readable media 306 may also include a reliability measuring module 318 to, when executed by the processor(s) 302, determine a number of reliability metrics of the connection between the network device and the NSO 102 including at least one of, for example, a reachability of the network device, an operating state of a management interface of the network device, and combinations thereof. Further, the reliability measuring module 318 may, when executed by the processor(s) 302, deliver the reliability metrics to the NSO 102 in order for the NSO 102 to categorize the network devices into a number of classes based on the reliability metric of the network device. In one example, the number of classes may include a first class defining that the network device is always available, a second class defining that the network device is intermittently available, and a third class defining that the network device is always unavailable. Although the above three classes are identified here, any number of classes may be utilized to categorize the network devices. The NSO 102 may also configure changes to the network device based on a prioritization of the first class over the second class and the second class over the third class. The reliability measuring module 318 may also, when executed by the processor(s) 302, cause the reliability metrics to be stored within the data store 308 as the reliability data of the characteristic/reliability data 312.

In one example, the NSO 102, the characteristic measuring module 316, and/or the reliability measuring module 318 may cause their respective measuring to be performed periodically. For example, these measurements may be performed between every 3 hours and every 24 hours. However, any temporal period may be used to determine when and how often the characteristic measuring module 316 and/or the reliability measuring module 318 may be executed.

The characteristic measuring module 316 and/or the reliability measuring module 318 may utilize a probe callback to obtain their respective data from the connections and network devices. In one example, the probe callback may be compatible with the network devices. The probe callback may include any request from the NSO 102 that may notify the NSO 102 of the state of dataflow between the NSO 102 and network devices included in the enterprise networks 206 and/or the network devices. This data may include the above-described connection characteristics such as connection latency, jitter, and bandwidth and a number of reliability metrics. In one example, the probe callback may be requested based on the periodic measurements performed herein. Data obtained from the probe callback may be persisted or stored in the data store 308 which may include or may form at least part of the CDB 110 described herein.

The computer-readable media 306 may also include a categorization module 320 to, when executed by the processor(s) 302, categorize the connections or links between the network device and the NSO 102 based at least in part on the connection characteristics such as connection latency, jitter, and bandwidth, among other connection characteristics as determined by the characteristic measuring module 316. Further, the categorization module 320 may also, when executed by the processor(s) 302, categorize the network devices within the network into a number of classes based on the reliability metric of the network device as determined by the reliability measuring module 318. The number of classes may include, for example, a first class defining that the network device is always available, a second class defining that the network device is intermittently available, and a third class defining that the network device is always unavailable.

The computer-readable media 306 may also include a tuning module 322 to, when executed by the processor(s) 302, tune a configuration of the network devices based at least in part on the connection type identified by the network orchestrator (e.g., the NSO 102). The tuning module 322 may also tune a configuration of the network devices based at least in part on the connection type identified by the NSO 102, the connection characteristics such as connection latency, jitter, and bandwidth, among other connection characteristics as determined by the characteristic measuring module 316, the reliability metric of the network device as determined by the reliability measuring module 318, the class of the network devices within the network as determined by the reliability measuring module 318, other parameters, and combinations thereof.

The computer-readable media 306 may also include a lookup module 324 to, when executed by the processor(s) 302, lookup a number of the characteristic and/or reliability data 312 in the data store 308 (e.g., the CDB 110) in order to use that data to categorize the connections or links between the network device and the NSO 102 based at least in part on the connection characteristics as determined by the characteristic measuring module 316 and/or a number of reliability metrics of the connection between the network device and the NSO 102 including at least one of, for example, a reachability of the network device, an operating state of a management interface of the network devices, and combinations thereof as determined by the reliability measuring module 318. The data looked up by the lookup module 324 may be use by the categorization module 320 and/or the network configuration module 326 to configure a number of network devices within the network.

The computer-readable media 306 may also include a network configuration module 326 to, when executed by the processor(s) 302, configure at least one network device based on the data obtained by executing the characteristic measuring module 316, the reliability measuring module 318, the categorization module 320, the tuning module 322, and/or the lookup module 324. In one example, the network devices may include routers, switches, access points, firewalls, WIFI communications devices, and myriad of other physical and virtual computing devices that may form part of the enterprise networks 206. Client devices including physical devices and VMs may be communicatively coupled to the enterprise networks 206. In one example, the client devices including physical devices and VMs may also be configured via execution of the configuration module 326.

Figure 4:
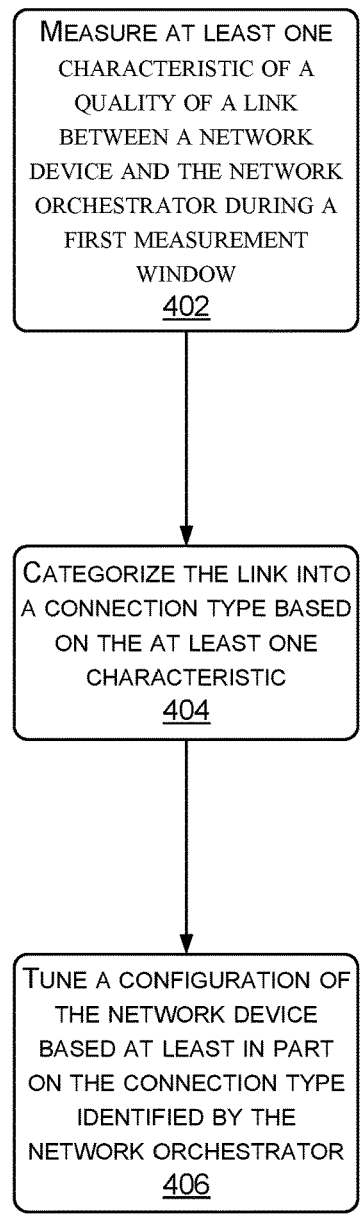
FIG. 4 illustrates a flow diagram of an example method of configuring network devices, according to an example of the principles described herein.

FIG. 4 illustrates a flow diagram of an example method 400 of configuring network devices, according to an example of the principles described herein. The method 400 may include, with the network orchestrator (e.g., the NSO 102), measuring at least one characteristic of a quality of a connection or link between a network device and the NSO 102 during a first measurement window at 402. At 404, the NSO 102 may categorize the connection or link into a connection type based on the at least one characteristic. The method may further include, at 406, tuning a configuration of the network device based at least in part on the connection type identified by the network orchestrator. Details regarding these and other processes will be described below in connection with FIG. 5.

Figure 5:
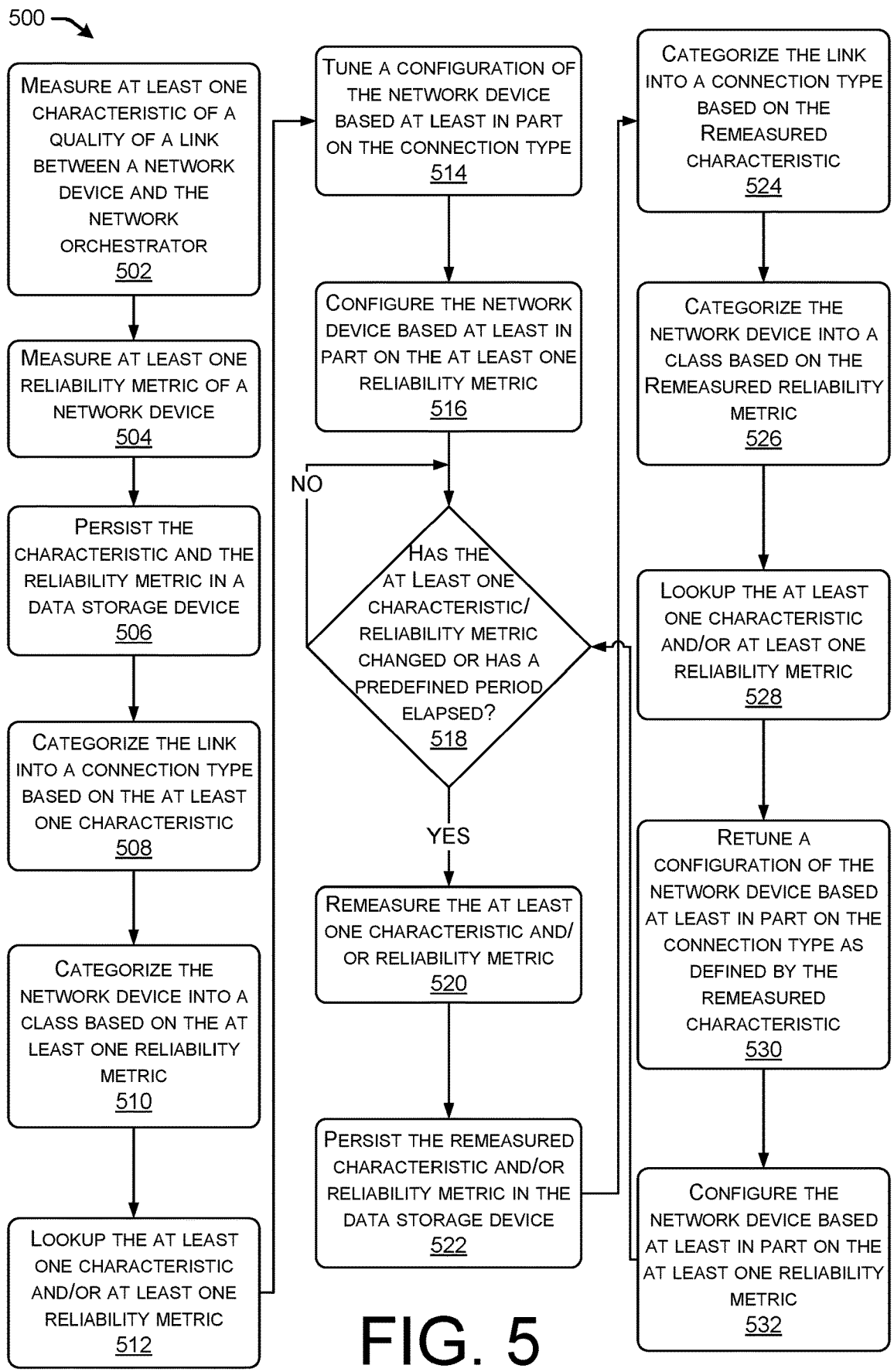
FIG. 5 illustrates a flow diagram of an example method of configuring network devices, according to an example of the principles described herein.

FIG. 5 illustrates a flow diagram of an example method 500 of configuring network devices, according to an example of the principles described herein. At 502, the NSO 102 may execute the characteristic measuring module 316 to measure at least one characteristic of a connection or link between at least one network device within the enterprise network(s) 206 and the NSO 102. Again, the at least one characteristic may include connection latency, jitter, and bandwidth, among other characteristics. In one example, the measuring of the at least one characteristic of the quality of the link between the network device and the network orchestrator may include, with the NSO 102, transmitting a probe callback. The probe callback, as described herein, may establishing a connection with the network device, measuring the at least one characteristic, and transmitting the characteristics as measured to the NSO 102.

At 504, the NSO 102 may execute the reliability measuring module 318 to measure at least one reliability metric of at least one network device within the enterprise network(s) 206. The reliability metric may include or define at least one of a reachability of at least one network device within the enterprise network(s) 206, an operating state of a management interface of the network device, or combinations thereof.

The characteristic(s) measured at 502 and the reliability metric(s) measured at 504 may be persisted or stored in a data in the data store 308 (e.g., the CDB 110) at 506. In one example, the characteristic(s) measured at 502 and the reliability metric(s) measured at 504 may be stored as the characteristic and/or reliability data 312.

At 508, the NSO 102 may, by executing the categorization module 320, categorize the connection or link between the network device within the enterprise network(s) 206 and the NSO 102 into a connection type based on the at least one characteristic. The categorization of the connection or link may include categorization based on connection latency, jitter, and bandwidth, among other characteristics. The below table presents an example as to how the connection or link may be categorized.

TABLE 1

| Connection Type Backhaul Characteristics | | | |
|---|---|---|---|
| | Latency | Up/Down | Packet Loss |
| Type A | <20 milliseconds (ms) | >100 megabytes per second (mbps) | <1% |
| Type B | <80 ms | >50 mbps | <3% |
| Type C | <200 ms | >10 mbps | <5% |
| Type D | >200 ms | <10 mbps | >5% |

The measurement of the connection or link may be performed periodically and based on the periodic measurement of the link quality, the NSO 102 may categorize the connection into the predefined types depicted in Table 1 above and/or other types. In one example, the NSO 102 may define the type of connections based on the latency, up/down link speed, jitter, packet loss, and/or other characteristics. As depicted in Table 1, the connection or link may be divided or categorized into four different types; Type A, Type B, Type C, and Type D. Type A may include any connection or link that has less than a 20 ms latency, greater than a 100 mbps up/down link speed, and a packet loss percentage less than 1%. Type B may include any connection or link that has less than a 80 ms latency, greater than a 50 mbps up/down link speed, and a packet loss percentage less than 3%. Type C may include any connection or link that has less than a 200 ms latency, greater than a 10 mbps up/down link speed, and a packet loss percentage less than 5%. Type D may include a catchall categorization that include all other connections or links that do not fit under Types A through C. Type D may include any connection or link that has greater than a 200 ms latency, less than a 10 mbps up/down link speed, and a packet loss percentage greater than 5%.

Turning again to FIG. 5, at 510, the NSO 102 may, by executing the categorization module 320, categorize the network device into a number of classes based on the reliability metric of the network device as determined at 504. The number of classes may, in one example, include three classes where a first class includes those network devices that are always available, a second class includes those network devices that are intermittently available, and a third class includes those network devices that are always unavailable. As described herein, the changes to the network device may be based on a prioritization of the first class over the second class and the second class over the third class.

To begin the configuration of the network device(s) included in the enterprise networks 206, the NSO 102, at 512, may execute the lookup module 324 to look up the at least one characteristic as measured via the execution of the characteristic measuring module 316 and the probe callback, and/or the at least one reliability metric as measured via the reliability measuring module 318. This data may be looked up in the data storage device 308 (e.g., the CDB 110) since at 506, these data are stored therein. These data may be returned to the NSO 102, and, at 514, the configuration of the network device(s) within the enterprise networks 206 may be tuned based at least in part on the connection type (Table 1) identified by the NSO 102. This tuning at 514 may include configuring the network device(s) within the enterprise networks 206 based on the characteristic as measured via the execution of the characteristic measuring module 316.

In one example, the NSO 102 may tune the configuration of the network devices in terms of a number of protocol including at least one of protocol timer values, retry count, and keep-alive timeouts, among other protocol. These protocol may be based on the connection type defined by the execution of the categorization module 320 by the NSO 102. Table 2 below is an example of protocols defined for WIFI access points and/or citizens broadband radio service (CBRS) devices.

TABLE 2

Configuration Values based on Connection Type of Table 1

| | Configuration Values for WIFI Access Points/CBRS |
|---|---|
| Type A | protocol request retry count: 3 |
| | protocol response timeout: 5 sec |
| | protocol keep retry count: 3 |
| | protocol keep alive timeout: 5 sec |
| Type B | protocol request retry count: 5 |
| | protocol response timeout: 10 sec |
| | protocol keep retry count: 5 sec |
| | protocol keep alive timeout: 10 sec |
| Type C | protocol request retry count: 5 |
| | protocol response timeout: 30 sec |
| | protocol keep retry count: 5 |
| | protocol keep alive timeout: 30 sec |
| Type D | protocol request retry count: 10 |
| | protocol response timeout: 60 sec |
| | protocol keep retry count: 10 |
| | protocol keep alive timeout: 60 sec |

When the NSO 102 is tasked with delivering a change to a network device, the NSO 102 may look up the device characteristics in its operational datastore including the data store 308 (e.g., CDB 110) via execution of the lookup module 324. When initiating a configuration session with the network device(s) included in the enterprise networks 206, the NSO 102 may take into account the device characteristics and configure the timers for the network device(s) accordingly. Table 2, above includes example configuration values. Further, if the configuration is delivered to the network device(s) through a NED 114, the NSO 102 may provide the device characteristic to the NED 114. With this data and information in the NED 114, the NED 114 is enabled to fine-tune its operations towards the network device.

At 516 of FIG. 5, the NSO 102 may configure the network device(s) of the enterprise networks 206 based at least in part on the at least one reliability metric measured at 504 and looked up at 512. In one example, changes to the network device(s) may be based on the above described classes including a first class defining that the network device is always available, a second class defining that the network device is intermittently available, and a third class defining that the network device is always unavailable. In one example, network devices belong to the first class if they do not have more than one failed connection attempt in the last week, and the network device(s) belong to the third class if they have no successful connection attempts in the previous week.

Prioritization of the classes may include prioritizing the first class over the second class and the second class over the third class. In this manner, the classification performed at 510 and applied at 516 imparts a combination of usability and efficiency improvements on the configuration of the network device(s). In one example where a system that uses queues of configuration changes such as NSO 102 commit-queues may prioritize configuration changes for known reliable network devices (e.g., network devices in the first class and/or the second class) and postpone changes destined for a known unavailable or unreliable network device(s) (e.g., network devices in the second class and/or the third class). In one example, the NSO 102 may notify an administrator or other user when the network device(s) of the enterprise networks 206 moves to a lower connectivity class. The NSO 102 may also suppress and/or tag errors when a known unreliable network device(s) fails to respond. The classification provided at 510 and applied at 516 assist the administrator in prioritizing between errors that could be expected and errors that may be of higher importance (e.g., a core router failing to accept configuration versus a customer premises equipment (CPE) device being unavailable).

Since network issues may arise during the operation of the network device(s), it may be effective to consider changes in the characteristics measured at 504 and/or the reliability metrics measured at 506. Thus, at 518, it may be determined if at least one of the characteristics and/or reliability metric has changed and/or if a predefined period has elapsed. As mentioned above, it may occur that during a first measurement window the connection or link and/or the reliability of the network device(s) may degrade. In these situations, an additional measurement of the characteristics and/or reliability by the NSO 102 may be performed in order to keep track of timeout and connection failures and reliability changes among the network device(s) of the enterprise networks 206 once the network device(s) are categorized into a specific category and/or class. In one example, if the failure exceeds a first predefined value or if the reliability metrics change past a second predefined value, then the NSO 102 may automatically downgrade or upgrade the connection to a lower type without waiting for the next measurement cycle and/or may place the network device(s) in a different class. In one example, a first measurement window defining a first time period in which the measurements of 502 and 504 may be included to allow baseline or initial measurements to be obtained. Further, in one example, a second or subsequent measurement window defining a second time period in which the measurements of 502 and 504 may be obtained may be provided to allow for changes in the network to be detected and addressed. Thus, at 518, the NSO 102 may detect such changes or a predefined time period may have elapsed that triggers the second or subsequent measurement window. In response to no changes being detected and the predefined time period not having lapsed (518, determination NO), the process may loop to before 518 where the determination at 518 may be made again.

In response to the NSO 102 detecting changes in the network and/or the predefined time period having lapsed (518, determination YES), the method may include, at 520, remeasuring the at least one characteristic of the connection of link between the network device(s) and the NSO 102 and/or may remeasure the reliability metric of the network device(s) in the enterprise networks 206 in a manner similar to 504 and 506. At 522, the remeasured characteristics and/or reliability metrics may be persisted or stored in a data storage device such as the data store 308 (e.g., the CDB 110) in manner similar to 506.

In a manner similar to 508, the NSO 102 may categorize the connection or link into a connection type based on the remeasured characteristic(s) at 524, and, in a manner similar to 510, the NSO 102 may categorize the network device(s) into a class based on the remeasured reliability metric(s) at 526. The NSO 102 may look up at least one remeasured characteristic and/or remeasured reliability metric at 528 in a manner similar to 512.

At 530 the NSO may retune the configuration of the network device(s) based on the connection type as defined by the remeasured characteristics in a manner similar to 514. Further, the NSO 102 may configure the network device(s) based at least in part on the at least one reliability metric at 532 in a manner similar to 516. This remeasuring and retuning/reconfiguring process of 518 through 532 allows for continued configuration of the network device(s) of the enterprise networks 206. At 532, the process of 518 through 532 may loop back to 518 any number of times in order to provide for a number of subsequent determinations as to whether the network device(s) of the enterprise networks 206 should be reconfigured.

Figure 6:
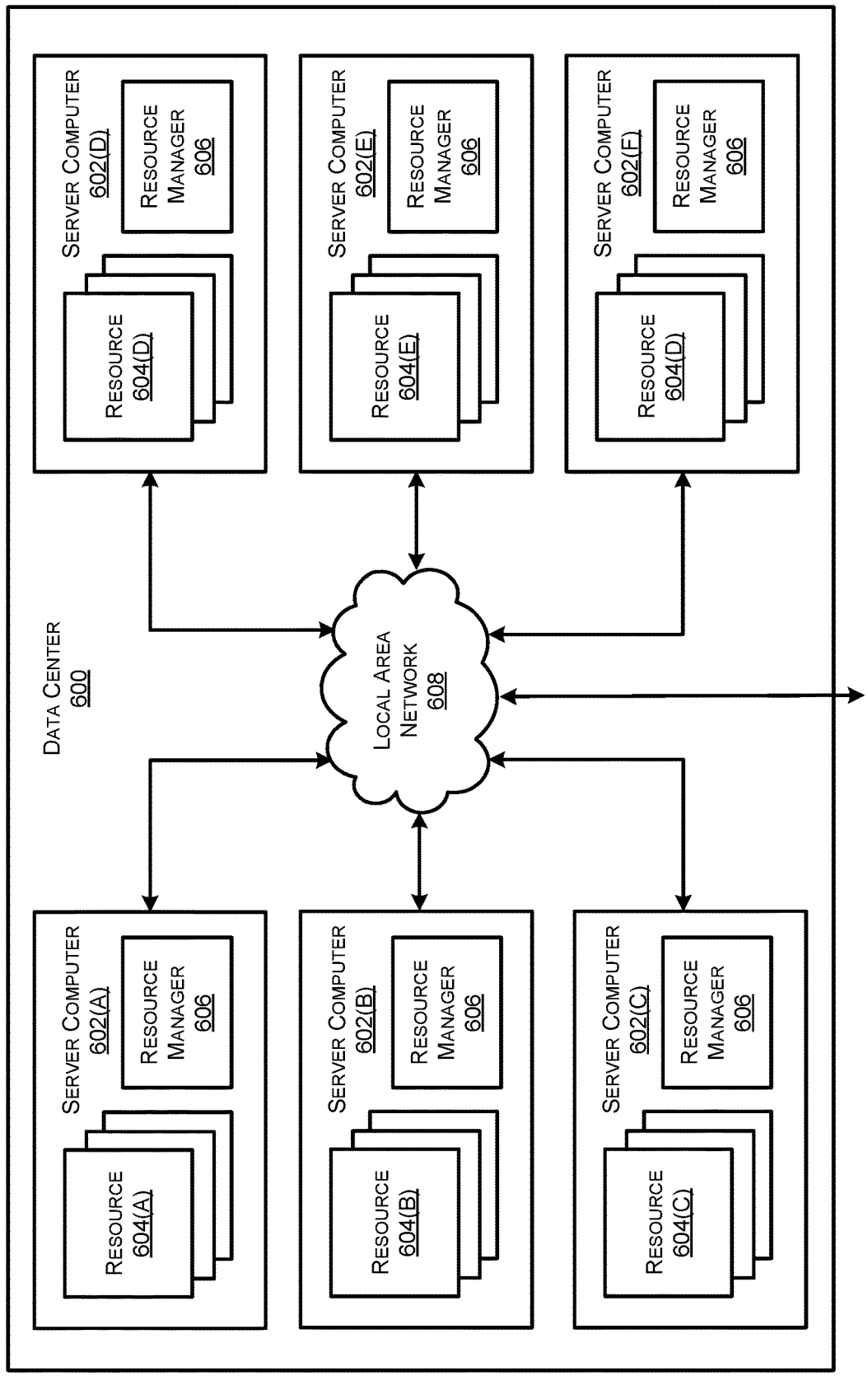
FIG. 6 illustrates a computing system diagram illustrating a configuration for a data center that may be utilized to implement aspects of the technologies disclosed herein.

FIG. 6 illustrates a computing system diagram illustrating a configuration for a data center 600 that may be utilized to implement aspects of the technologies disclosed herein. The example data center 600 shown in FIG. 6 includes several server computers 602A-602F (which might be referred to herein singularly as "a server computer 602" or in the plural as "the server computers 602) for providing computing resources. In some examples, the resources and/or server computers 602 may include, or correspond to, any type of networked device described herein. Although described as servers, the server computers 602 may comprise any type of networked device, such as servers, switches, routers, hubs, bridges, gateways, modems, repeaters, access points, etc.

The server computers 602 may be standard tower, rack-mount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, virtual private networks (VPNs), and others. Some of the server computers 602 may also be configured to execute a resource manager 606 capable of instantiating and/or managing the computing resources. In the case of VM instances, for example, the resource manager 606 may be a hypervisor or another type of program configured to enable the execution of multiple VM instances on a single server computer 602. Server computers 602 in the data center 600 may also be configured to provide network services and other types of services.

In the example data center 600 shown in FIG. 6, an appropriate LAN 608 is also utilized to interconnect the server computers 602A-602F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 600, between each of the server computers 602A-602F in each data center 600, and, potentially, between computing resources in each of the server computers 602. It may be appreciated that the configuration of the data center 600 described with reference to FIG. 6 is merely illustrative and that other implementations may be utilized.

In some examples, the server computers 602 and or the computing resources 604 may each execute/host one or more tenant containers and/or virtual machines to perform techniques described herein.

In some instances, the data center 600 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 604 provided by the cloud computing network may include various types of computing resources, such as data processing resources like tenant containers and VM instances, data storage resources, networking resources, data communication resources, network services, VPN instances, and the like.

Each type of computing resource 604 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 604 not mentioned specifically herein.

The computing resources 604 provided by a cloud computing network may be enabled in one example by one or more data centers 600 (which might be referred to herein singularly as "a data center 600" or in the plural as "the data centers 600). The data centers 600 are facilities utilized to house and operate computer systems and associated components. The data centers 600 typically include redundant and backup power, communications, cooling, and security systems. The data centers 600 may also be located in geographically disparate locations. One illustrative example for a data center 600 that may be utilized to implement the technologies disclosed herein is described herein with regard to, for example, FIGS. 1 through 5.

Figure 7:
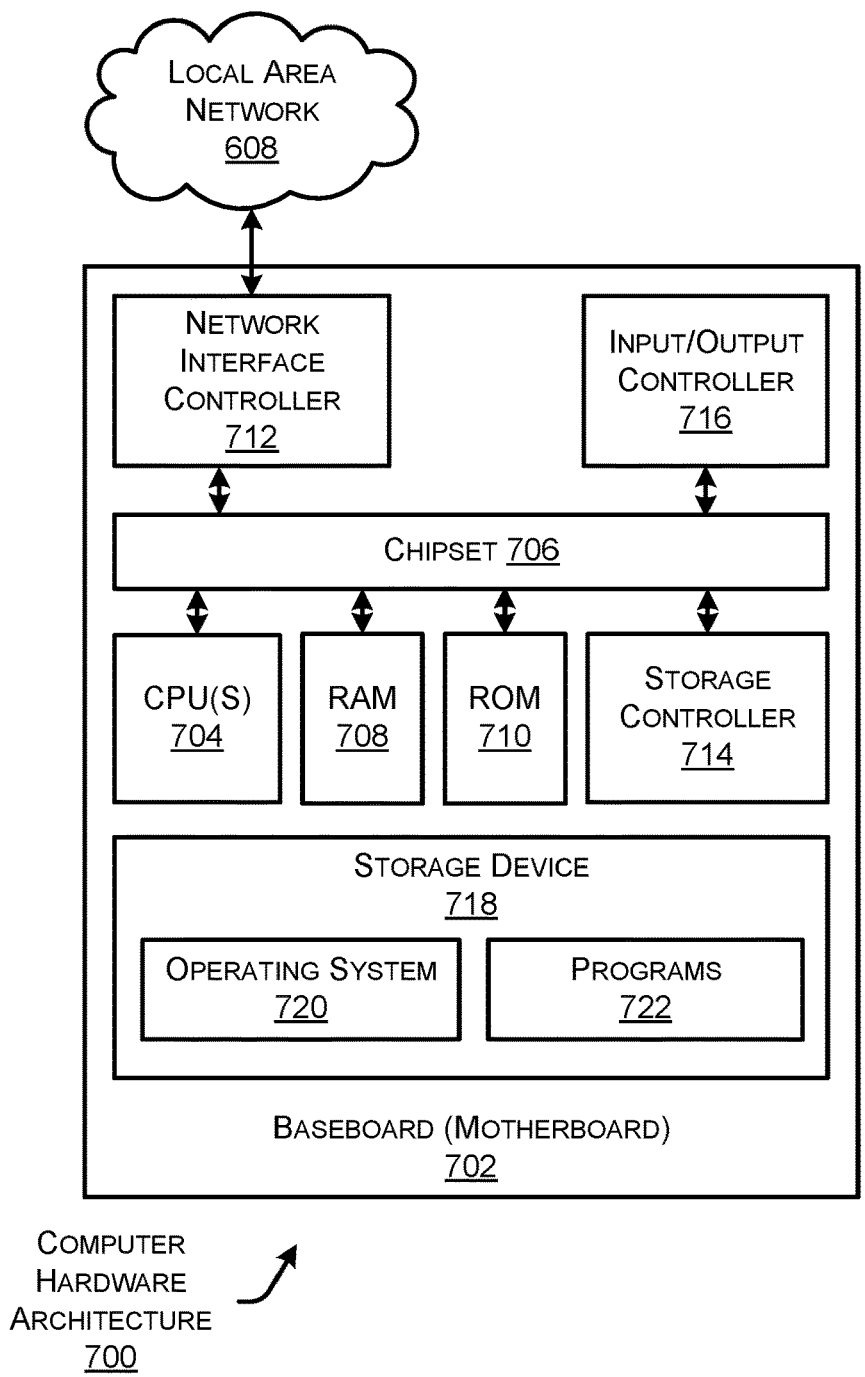
FIG. 7 illustrates a computer architecture diagram showing an example computer hardware architecture for implementing a computing device that may be utilized to implement aspects of the various technologies presented herein.

FIG. 7 illustrates a computer architecture diagram showing an example computer hardware architecture 700 for implementing a computing device that may be utilized to implement aspects of the various technologies presented herein. The computer hardware architecture 700 shown in FIG. 7 illustrates the NSO 102, the multi-domain physical and/or virtual infrastructure 122, the cloud network 202, the enterprise networks 206, and/or other systems or devices associated with the NSO 102 and/or remote from the NSO 102, a workstation, a desktop computer, a laptop, a tablet, a network appliance, an e-reader, a smartphone, or other computing device, and may be utilized to execute any of the software components described herein. The computer 700 may, in some examples, correspond to a network device (e.g., NSO 102, the multi-domain physical and/or virtual infrastructure 122, the cloud network 202, and/or the enterprise networks 206 (and associated devices) described herein, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices may be connected by way of a system bus or other electrical communication paths. In one illustrative configuration, one or more central processing units (CPUs) 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network, such as the NSO 102, the multi-domain physical and/or virtual infrastructure 122, the cloud network 202, and the enterprise networks 206, among other devices. The chipset 706 may include functionality for providing network connectivity through a Network Interface Controller (NIC) 712, such as a gigabit Ethernet adapter. The NIC 712 is capable of connecting the computer 700 to other computing devices within the NSO 102 and external to the NSO 102. It may be appreciated that multiple NICs 712 may be present in the computer 700, connecting the computer to other types of networks and remote computer systems. In some examples, the NIC 712 may be configured to perform at least some of the techniques described herein, such as packet redirects and/or other techniques described herein.

The computer 700 may be connected to a storage device 718 that provides non-volatile storage for the computer. The storage device 718 may store an operating system 720, programs 722 (e.g., any computer-readable and/or computer-executable code described herein), and data, which have been described in greater detail herein. The storage device 718 may be connected to the computer 700 through a storage controller 714 connected to the chipset 706. The storage device 718 may consist of one or more physical storage units. The storage controller 714 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the storage device 718 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 718 is characterized as primary or secondary storage, and the like.

For example, the computer 700 may store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the storage device 718 by detecting the physical states or characteristics of one or more particular locations within the physical storage units.

In addition to the storage device 718 described above, the computer 700 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 700. In some examples, the operations performed by the NSO 102, the multi-domain physical and/or virtual infrastructure 122, the cloud network 202, the enterprise networks 206, and/or any components included therein, may be supported by one or more devices similar to computer 700. Stated otherwise, some or all of the operations performed by the NSO 102, the multi-domain physical and/or virtual infrastructure 122, the cloud network 202, the enterprise networks 206, and/or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 718 may store an operating system 720 utilized to control the operation of the computer 700. According to one example, the operating system 720 comprises the LINUX operating system. According to another example, the operating system comprises the WINDOWS® SERVER operating system from MICROSOFT Corporation of Redmond, Wash. According to further examples, the operating system may comprise the UNIX operating system or one of its variants. It may be appreciated that other operating systems may also be utilized. The storage device 718 may store other system or application programs and data utilized by the computer 700.

In one example, the storage device 718 or other computer-readable storage media is encoded with computer-executable instructions which, when loaded into the computer 700, transform the computer from a general-purpose computing system into a special-purpose computer capable of implementing the examples described herein. These computer-executable instructions transform the computer 700 by specifying how the CPUs 704 transition between states, as described above. According to one example, the computer 700 has access to computer-readable storage media storing computer-executable instructions which, when executed by the computer 700, perform the various processes described above with regard to FIGS. 1 through 6. The computer 700 may also include computer-readable storage media having instructions stored thereupon for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, an input/output controller 716 may provide output to a display, such as a computer monitor, a flat-panel display, a digital projector, a printer, or other type of output device. It will be appreciated that the computer 700 might not include all of the components shown in FIG. 7, may include other components that are not explicitly shown in FIG. 7, or might utilize an architecture completely different than that shown in FIG. 7.

As described herein, the computer 700 may comprise one or more of the NSO 102, the multi-domain physical and/or virtual infrastructure 122, the cloud network 202, the enterprise networks 206, and/or other systems or devices associated with the NSO 102 and/or remote from the NSO 102. The computer 700 may include one or more hardware processor(s) such as the CPUs 704 configured to execute one or more stored instructions. The CPUs 704 may comprise one or more cores. Further, the computer 700 may include one or more network interfaces configured to provide communications between the computer 700 and other devices, such as the communications described herein as being performed by the NSO 102, the multi-domain physical and/or virtual infrastructure 122, the cloud network 202, the enterprise networks 206, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth. The programs 722 may comprise any type of programs or processes to perform the techniques described in this disclosure for the NSO 102, the multi-domain physical and/or virtual infrastructure 122, the cloud network 202, and the enterprise networks 206 as described herein. The programs 722 may enable the devices described herein to perform various operations.

CONCLUSION

The examples described herein provide a network orchestrator (NSO) that is capable of understanding the NSO to network device connection characteristics. This is beneficial as the NSO may improve its throughput and provide valuable insight to an administrator or other user. This leads to a better product that can efficiently reduce operational costs and improve overall network reliability. The present systems and methods provide a mechanism to determine the network device to NSO connection characteristics such as connection latency, jitter, and bandwidth, among other characteristics. Further, the present systems and methods provide a mechanism that improves throughput characteristics of an NSO based on dynamically tuning the response timers and retries accordingly to detect the communication failure efficiently and faster. Further, the present systems and methods provide a mechanism that builds and provides insight into the network device characteristics to the users.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method of configuring network devices, comprising:
   with a network orchestrator:
      measuring at least one characteristic of a quality of a link between a network device and the network orchestrator during a first measurement window;
      categorizing the link into a connection type based on the at least one characteristic;
      measuring at least one reliability metric of the network device;
      changing configuration of the network device based at least in part on the connection type identified by the network orchestrator and the reliability metric of the network device; and
      based at least in part on the connection type, tuning the configuration in terms of a response timeout value, a retry count, and a keep-alive timeout value.

2. The method of claim 1, wherein the measuring of the at least one characteristic of the quality of the link between the network device and the network orchestrator comprises:

with the network orchestrator, transmitting a probe callback, the probe callback:
    establishing a connection with the network device;
    measuring the at least one characteristic; and
    transmitting the at least one characteristic as measured to the network orchestrator.

3. The method of claim 2, further comprising persisting in a data storage device the at least one characteristic as measured via the probe callback.

4. The method of claim 3, further comprising:
    looking up the at least one characteristic as measured via the probe callback in the data storage device; and
    configuring the network device based on the at least one characteristic.

5. The method of claim 1, wherein the at least one characteristic comprises at least one of latency, upload speed, download speed, jitter, packet loss, or combinations thereof.

6. The method of claim 1, further comprising:
    remeasuring the at least one characteristic at least once during a second measurement window based at least in part on detection of a change in the at least one characteristic has occurred; and
    recategorizing the link based at least in part on a determination that the at least one characteristic has changed.

7. The method of claim 1, wherein:
    the reliability metric defines at least one of a reachability of the network device, an operating state of a management interface of the network device, or combinations thereof, and
    measuring the at least one reliability metric of the network device comprises categorizing the network device into a number of classes based on the reliability metric of the network device, wherein the number of classes comprise:
        a first class defining that the network device is always available;
        a second class defining that the network device is intermittently available; and
        a third class defining that the network device is always unavailable; and
    configuring changes to the network device based on a prioritization of the first class over the second class and the second class over the third class.

8. A non-transitory computer-readable medium storing instructions that, when executed, causes a processor to perform operations, comprising:
    with a network orchestrator:
        measuring at least one characteristic of a quality of a link between a network device and the network orchestrator during a first measurement window;
        categorizing the link into a connection type based on the at least one characteristic;
        measuring at least one reliability metric of the network device;
        categorizing the network device into a number of classes based on the reliability metric of the network device;
        changing configuration of the network device based at least in part on the connection type identified by the network orchestrator and the reliability metric of the network device; and
        based at least in part on the connection type, tuning the configuration in terms of a response timeout value, a retry count, and a keep-alive timeout value.

9. The non-transitory computer-readable medium of claim 8, wherein the measuring of the at least one characteristic of the quality of the link between the network device and the network orchestrator comprises:
    with the network orchestrator, transmitting a probe callback, the probe callback:
        establishing a connection with the network device;
        measuring the at least one characteristic; and
        transmitting the at least one characteristic as measured to the network orchestrator.

10. The non-transitory computer-readable medium of claim 9, the operations further comprising persisting in a data storage device the at least one characteristic as measured via the probe callback.

11. The non-transitory computer-readable medium of claim 10, the operations further comprising:
    looking up the at least one characteristic as measured via the probe callback in the data storage device; and
    configuring the network device based on the at least one characteristic.

12. The non-transitory computer-readable medium of claim 8, wherein the at least one characteristic comprises at least one of latency, upload speed, download speed, jitter, packet loss, or combinations thereof.

13. The non-transitory computer-readable medium of claim 8, the operations further comprising:
    remeasuring the at least one characteristic at least once during a second measurement window based at least in part on detection of a change in the at least one characteristic has occurred; and
    recategorizing the link based at least in part on a determination that the at least one characteristic has changed.

14. The non-transitory computer-readable medium of claim 8, wherein:
    the reliability metric defines at least one of a reachability of the network device, an operating state of a management interface of the network device, or combinations thereof, and wherein:
        a first class defining that the network device is always available;
        a second class defining that the network device is intermittently available; and
        a third class defining that the network device is always unavailable; and
    configuring the changes to the network device is based at least in part on a prioritization of the first class over the second class and the second class over the third class.

15. A network orchestrator comprising:
    a processor; and
    a non-transitory computer-readable media storing instructions that, when executed by the processor, causes the processor to perform operations comprising:
        measuring at least one characteristic of a quality of a link between a network device and the network orchestrator during a first measurement window;
        categorizing the link into a connection type based on the at least one characteristic;
        measuring at least one reliability metric of the network device, the reliability metric defining at least one of a reachability of the network device, an operating state of a management interface of the network device, or combinations thereof;
        categorizing the network device into a number of classes based on the reliability metric of the network device;

changing configuration of the network device based at least in part on the connection type identified by the network orchestrator and the reliability metric of the network device; and based at least in part on the connection type, tuning the configuration in terms of a response timeout value, a retry count, and a keep-alive timeout value.

16. The network orchestrator of claim 15, wherein the measuring of the at least one characteristic of the quality of the link between the network device and the network orchestrator comprises:

with the network orchestrator, transmitting a probe callback, the probe callback:
  establishing a connection with the network device;
  measuring the at least one characteristic; and
  transmitting the at least one characteristic as measured to the network orchestrator;

persisting in a data storage device the at least one characteristic as measured via the probe callback;

looking up the at least one characteristic as measured via the probe callback in the data storage device; and configuring the network device based on the at least one characteristic.

17. The network orchestrator of claim 15, the operations further comprising:

remeasuring the at least one characteristic at least once during a second measurement window based at least in part on detection of a change in the at least one characteristic has occurred; and recategorizing the link based at least in part on a determination that the at least one characteristic has changed.

18. The network orchestrator of claim 15, wherein the classes comprise:
  a first class defining that the network device is always available;
  a second class defining that the network device is intermittently available; and
  a third class defining that the network device is always unavailable,
  wherein configuring the changes to the network device is based at least on part on a prioritization of the first class over the second class and the second class over the third class.

\* \* \* \* \*